US011870514B2

(12) United States Patent
Reial et al.

(10) Patent No.: US 11,870,514 B2
(45) Date of Patent: Jan. 9, 2024

(54) MULTI-USER COORDINATION (71) Applicant: Telefonaktiebolaget LM Ericsson (publ), Stockholm (SE)

(72) Inventors: Andres Reial, Lomma (SE); Krishna Chitti, Lund (SE); Zhipeng Lin, Nanjing Jiangsu (CN); Athanasios Stavridis, Malmö (SE); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 295 days.

(21) Appl. No.: 17/276,310

(22) PCT Filed: Sep. 27, 2019

(86) PCT No.: PCT/EP2019/076164
§ 371 (c)(1),
(2) Date: Mar. 15, 2021

(87) PCT Pub. No.: WO2020/065002
PCT Pub. Date: Apr. 2, 2020

(65) Prior Publication Data
US 2021/0266045 A1 Aug. 26, 2021

(30) Foreign Application Priority Data

Sep. 27, 2019 (WO) ............... PCT/CN2019/076164

(51) Int. Cl.
*H04B 7/0452* (2017.01)
*H04B 7/06* (2006.01)
(Continued)

(52) U.S. Cl.
CPC ......... *H04B 7/0452* (2013.01); *H04B 7/0686* (2013.01); *H04J 11/0023* (2013.01);
(Continued)

(58) Field of Classification Search
None
See application file for complete search history.

(56) References Cited

U.S. PATENT DOCUMENTS

2016/0073418 A1* 3/2016 Miyata ................ H04B 7/0697
370/330
2016/0112992 A1* 4/2016 Bhushan ............... H04W 72/04
370/330
(Continued)

FOREIGN PATENT DOCUMENTS

EP 3396865 A1 10/2018
JP 2018137669 * 8/2018 ........... H04B 7/0452
(Continued)

OTHER PUBLICATIONS

International Search Report and the Written Opinion of the International Searching Authority, issued in corresponding International Application No. PCT/EP2019/076164, dated Jan. 28, 2020, 17 pages.

(Continued)

*Primary Examiner* — Mariela Vidal Carpio
(74) *Attorney, Agent, or Firm* — Rothwell, Figg, Ernst & Manbeck, P.C.

(57) ABSTRACT

A method of a communication device configured with two or more multi-user coordination modes for communication with a plurality of users is disclosed. The method comprises determining an available spatial selectivity for the plurality of users, and selecting one of the two or more multi-user coordination modes based on the determined available spatial selectivity and a number of users of the plurality. Corresponding apparatus, communication receiver and computer program product are also disclosed.

22 Claims, 3 Drawing Sheets (51) Int. Cl.
*H04J 11/00* (2006.01)
*H04J 13/00* (2011.01)
*H04L 5/00* (2006.01)

(52) U.S. Cl.
CPC ............ *H04J 13/00* (2013.01); *H04L 5/0035* (2013.01); *H04J 2011/0003* (2013.01)

(56) References Cited

U.S. PATENT DOCUMENTS

| | | | |
|---|---|---|---|
| 2016/0329989 A1* | 11/2016 | Li | H04L 1/0061 |
| 2016/0330715 A1* | 11/2016 | Chen | H04W 72/04 |
| 2017/0156160 A1* | 6/2017 | Aryafar | H04W 74/0816 |
| 2018/0083808 A1* | 3/2018 | Jalloul | H04B 7/0452 |
| 2018/0110017 A1* | 4/2018 | Jha | H04L 1/0011 |
| 2018/0324801 A1* | 11/2018 | Sampathkumar | H04B 7/0626 |
| 2018/0375551 A1* | 12/2018 | Song | H04L 5/0026 |
| 2020/0267741 A1* | 8/2020 | Kwon | H04W 72/121 |
| 2021/0385695 A1* | 12/2021 | Liu | H04B 7/0452 |
| 2022/0312432 A1* | 9/2022 | Chen | H04B 7/0452 |

FOREIGN PATENT DOCUMENTS

| | | |
|---|---|---|
| JP | 2018137669 A | 8/2018 |
| WO | 2017107707 A1 | 6/2017 |

OTHER PUBLICATIONS

NTT Docomo, Inc. "Transmitter design for uplink Noma" 3GPP TSG RAN WG1 Meeting #94, R1-1809148, Gothenburg, Sweden, Aug. 20-24, 2018, 15 pages.

* cited by examiner

MULTI-USER COORDINATION

CROSS REFERENCE TO RELATED APPLICATION(S)

This application is a 35 U.S.C. § 371 National Phase Entry Application from PCT/EP2019/076164, filed Sep. 27, 2019, designating the United States, and also claims the benefit of International Application No. PCT/CN2018/108194, filed Sep. 28, 2018, the disclosures of which are incorporated herein by reference in their entirety.

TECHNICAL FIELD

The present disclosure relates generally to the field of communication devices. More particularly, it relates to multi-user coordination by a communication device.

BACKGROUND

Traditionally, signal transmission to, or from, multiple user equipments (UEs) in a cellular network (NW) is preferably done by ensuring, or at least attempting to ensure, orthogonality between the transmitted signals. Such an approach may be denoted conventional orthogonal multiple access (COMA). Typical ways to achieve such orthogonality is via allocation of orthogonal resources, such as resources that are orthogonal in one or more of a time domain, a frequency domain, and a spatial domain.

To mitigate imperfections in such allocations and/or to mitigate imperfections introduces by the propagation channel, a communication receiver typically applies signal processing aiming at restoring orthogonality. Examples of such signal processing include equalizing, interference rejection combining (IRC), and minimum mean square error (MMSE) detection. Application of such signal processing may be relevant for orthogonal frequency division multiplex (OFDM) receivers or multiple-input, multiple-output (MIMO) receivers; but also for non-linear variants of such receivers.

An extension of COMA transmission aims to reuse time-frequency (T/F) resources for serving users that are located in spatially non-overlapping regions of the cell coverage area. For example, in uplink multi-user MIMO (UL MU-MIMO) transmission, a multiple-antenna receiver in the network node (e.g., a gNB) may be used to separate signals from multiple users (UEs) sharing the same T/F resources when the users are spatially separated in a physical sense and/or their effective single-input, multiple-output (SIMO) channel vectors are sufficiently uncorrelated.

In some scenarios, it may be desirable to be able to handle of an even larger number of users (using the given communication resources) than would be allowed according to the COMA or MU-MIMO approach. One way of achieving this is to apply non-orthogonal multiple access (NOMA). In a typical NOMA scenario, at least two non-spatially separable users share T/F resources.

Resource allocation (e.g., T/F scheduling) of signals for MU-MIMO and/or NOMA transmission involves multiple parameters and trade-offs.

Therefore, there is a need for approaches for multi-user coordination. Such approaches may, for example involve selection of one of several available multi-user coordination modes and/or resource allocation for multi-user communication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by method of a communication device configured with two or more multi-user coordination modes for communication with a plurality of users.

The method may comprise determining an available spatial selectivity for the plurality of users.

The method may also comprise selecting one of the two or more multi-user coordination modes based on the determined available spatial selectivity and a number of users of the plurality.

In some embodiments, the two or more multi-user coordination modes may comprise an orthogonal multiple access mode, a spatial multiple access mode, and a non-orthogonal multiple access mode.

When a received signal is a non-orthogonal multiple access (NOMA) signal, it may comprise respective signal parts of a plurality of users, wherein the respective signal parts may be superimposed in one or more of a time domain, a frequency domain, and a spatial domain.

In some embodiments, the method may further comprise determining a number of available communication resources for the plurality of users. Selecting the multi-user coordination mode may be further based on the determined number of available communication resources.

In some embodiments, selecting one of the two or more multi-user coordination modes may comprise selecting the orthogonal multiple access mode when the number of available communication resources is higher than, or equal to, the number of users of the plurality.

In some embodiments, selecting one of the two or more multi-user coordination modes may comprise selecting the spatial multiple access mode when the number of available communication resources is less than the number of users of the plurality, and the number of available communication resources, for each spatially separable group of users, is higher than, or equal to, the number of users of the group.

In some embodiments, selecting one of the two or more multi-user coordination modes may comprise selecting the non-orthogonal multiple access mode when the number of available communication resources for at least one of the spatially separable groups of users is less than the number of users of the group.

In some embodiments, selecting one of the two or more multi-user coordination modes may comprise, when the number of available communication resources for at least one of the spatially separable groups of users is less than the number of users of the group, selecting one of the non-orthogonal multiple access mode and the spatial multiple access mode.

In some embodiments, selecting one of the non-orthogonal multiple access mode and the spatial multiple access mode may be based on an achievable performance metric for each of the non-orthogonal multiple access mode and the spatial multiple access mode.

In some embodiments, the achievable performance metric may be an overall data rate for the plurality of users.

In some embodiments, the method may further comprise determining a cross correlation between signature sequences associated with the plurality of users. Selecting the multi-user coordination mode may be further based on the determined cross correlations.

In some embodiments, the method may further comprise communicating with the plurality of users according to the selected multi-user coordination mode.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for a communication device configured with two or more multi-user coordination modes. The apparatus comprises controlling circuitry.

The controlling circuitry may be configured to cause determination of an available spatial selectivity for the plurality of users.

The controlling circuitry may also be configured to cause selection of one of the two or more multi-user coordination modes based on the determined available spatial selectivity and a number of users of the plurality.

A fourth aspect is a communication device comprising the apparatus of the third aspect.

The communication device may, for example, be any of a wireless communication device, a (wireless) receiver device, and a radio access node (e.g., a network node).

In some embodiments, any of the above aspects may additionally have features identical with or corresponding to any of the various features as explained above for any of the other aspects.

An advantage of some embodiments is that approaches for multi-user coordination are provided.

Another advantage of some embodiments is that approaches are provided for selection of one of several available multi-user coordination modes and/or resource allocation for multi-user communication Yet an advantage of some embodiments is that approaches are provided for selection of when NOMA is to be applied.

According to various embodiments, interference is minimized or at least kept at a low level between NOMA UEs (and/or MU-MIMO UEs) that share T/F resources.

This may be achieved by (e.g., automatically) basing a decision regarding resource reuse on the actually available spatial separation for UEs.

According to some embodiments, NOMA is activated when (only when in some embodiments) an overloading of the system required to accommodate a number of users cannot be supported using MU-MIMO. This approach may lead to an improvement in that per-UE data rates are increased and/or in that the sum rate of NOMA/MU-MIMO UEs is increased.

Yet another advantage of some embodiments is that flexible transmit resource scheduling and/or flexible communication mode selection is provided; aiming at improvements in throughput and/or capacity.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, it may be desirable to be able to handle of an even larger number of users (using the given communication resources) than would be allowed according to the COMA or MU-MIMO approach. One example when this can be relevant is when the available degrees of freedom (DoF) regarding communication resources and spatial separation are fewer than the number of users to be served.

One way of achieving accommodation of a large number of users is to apply non-orthogonal multiple access (NOMA). In a typical NOMA approach, multiple UEs may be scheduled in the same T/F/S (timing-frequency-spatial) resources, whereby the signals of at least some of the different UEs will not be substantially orthogonal at the receiver. Thus, there will exist residual inter-user interference that needs to be handled by the receiver.

Thus, by the nature of NOMA transmission, multiple signals are received non-orthogonally and—generally—the overlapping (superpositioned) signals may typically need to be separated by the receiver prior to decoding. To assist such separation, UE-specific signature sequences (SSs) may be imposed on the signal of each user, which may facilitate extraction of the individual user signals at the receiver and/or which may enable construction of an effective end-to-end channel which is closer to diagonal (with less cross correlation between users) than without application of the SSs.

In an example of a NOMA approach utilizing SSs, each UE spreads its (e.g., quadrature amplitude modulation, QAM) information symbols using an N-length spreading sequence (signature sequence, SS, or signature vector) $\{s_k\}$. K denotes the number of simultaneously active UEs. For a base station (BS, e.g., a gNB) with single antenna, the received signal vector $y \in \mathbb{C}^N$ can be written as $$y = \sum_{k=1}^{K} s_k \odot h_k x_k + w,$$

where N is the number of resources (e.g., resource elements, REs) spanned by the signature vectors and carrying the same information symbols, $h_k$ is the channel vector between the k-th UE and the gNB; $x_k$ is the information symbol of the k-th UE, w represents noise, and the operator $\odot$ stands for the pointwise multiplication of two vectors (Hadamard product). For a base station with multiple receive antennas, the received signal corresponding to a single information symbol may be formed by concatenating the N-length received vector y from each antenna.

From a system performance point-of-view, it may be considered optimal to jointly choose transmit strategies for all UEs and then employ a joint multi-user detector (MUD). Typically, the signature sequences are designed to have certain desired correlation properties, and the construction of the signature sequences $\{s_k\}$ (SS) lead to differences between various transmission schemes.

The SS design may be based on different criteria, e.g. low cross-correlation and/or sparsity. In general, when overloading the system with more UEs than can be supported by time-frequency-spatial resources, some residual interference between users will remain as mentioned above. The design of SSs may typically focus on creating sequence sets that minimize that crosstalk between UEs, e.g. Welch bound sequences.

In this disclosure, the focus of various examples will without being intended as limiting be on symbol-level spreading schemes and the term "signature sequence" (SS) will be used to refer to NOMA user-specific signatures that differentiate the signals of the users (and are used to separate the signals at the receiver). Other terms may exist, e.g., the more general term "signature" which may be used to include many types of NOMA schemes.

The NW is typically in control of the UE operating mode—scheduling according to COMA, MU-MIMO, and/or NOMA (e.g., using signature sequences for further separation). In the NOMA mode, both the transmitter and the receiver (e.g., the UE and the network node, respectively, in a cellular NW uplink (UL) use case), are typically aware of the relevant signature sequence(s) used and/or of relevant properties of the signature sequence(s) used. For example, the NW may inform each UE about its allocated SS and/or provide other information which is sufficient for the UE to determine a suitable SS.

As mentioned above, by the nature of NOMA transmission, multiple signals are received non-orthogonally and— generally—the overlapping (superpositioned) signals may typically need to be separated by the receiver prior to decoding. This is similar to a scenario with, e.g., MU-MIMO signaling when the spatial selectivity of the receiver is insufficient to fully separate the UEs.

However, the individual signals in COMA and/or MU-MIMO access are often separable at the receiver with a moderate (e.g., computational) effort, while NOMA signals deliberately share resources in one or more domains and thereby incur poor demodulation and decoding quality compared to COMA and/or MU-MIMO access signals. Thus, NOMA typically requires particular efforts at the receiver to address the cross-correlation.

Exemplifying in the context of fifth generation (5G) new radio (NR), COMA may typically be used to multiplex UEs to different resources in the time/frequency grid. In many uplink multiple access scenarios, MU-MIMO may additionally be used to accommodate more UEs than permitted by time/frequency multiplexing alone. NOMA transmission may then be viewed as an additional tool for augmenting COMA and/or MU-MIMO; e.g., in situations where the time/frequency resources and the spatial degrees of freedom are insufficient to accommodate all UEs. The augmentation may be achieved by providing additional UE separation using signature sequences. MU-MIMO and NOMA may be applied simultaneously or separately, and they may be viewed as non-conflicting mechanisms for accommodating user overload.

Resource allocation (e.g., T/F scheduling) of signals for MU-MIMO and/or NOMA transmission involves multiple parameters and trade-offs. This is exemplified in the following.

In MU-MIMO, co-scheduling UEs in large overlapping physical resource block (PRB) groups may be advantageous since each UE can then use low order modulation and/or a low coding rate (e.g., a low-index modulation and coding scheme (MCS)). However, co-scheduled UEs (UEs sharing T/F resources) are typically subjected to interference if they are not fully separated by receiver processing.

In NOMA, application of symbol-level (or other signature) spreading intrinsically leads to PRB overlap of the signals of the different UEs. Since the signature design for UE overload cases is non-orthogonal, separation of the overlapping signals may generally not be perfect. Residual interference due to imperfect separation may lead to decreased reception quality and/or decreased achievable per-UE data rate and/or decreased achievable cell data rate.

Therefore, as already noted above, there is a need for approaches for multi-user coordination. Such approaches may, for example involve selection of one of several available multi-user coordination modes and/or resource allocation for multi-user communication.

A transmission framework may be beneficial that balances the signal overlap of potentially interfering UEs with a goal of maximizing available resources per-UE to operate at a most efficient MCS.

In the following, embodiments will be described whereby approaches for multi-user coordination (e.g., resource allocation and/or transmission scheme selection for multiple access) is provided.

It should be noted that the approach is explained for an uplink multi-user (UL MU) transmission example, but it should be noted that the principles are equally applicable to downlink (DL) transmission.

Figure 1:
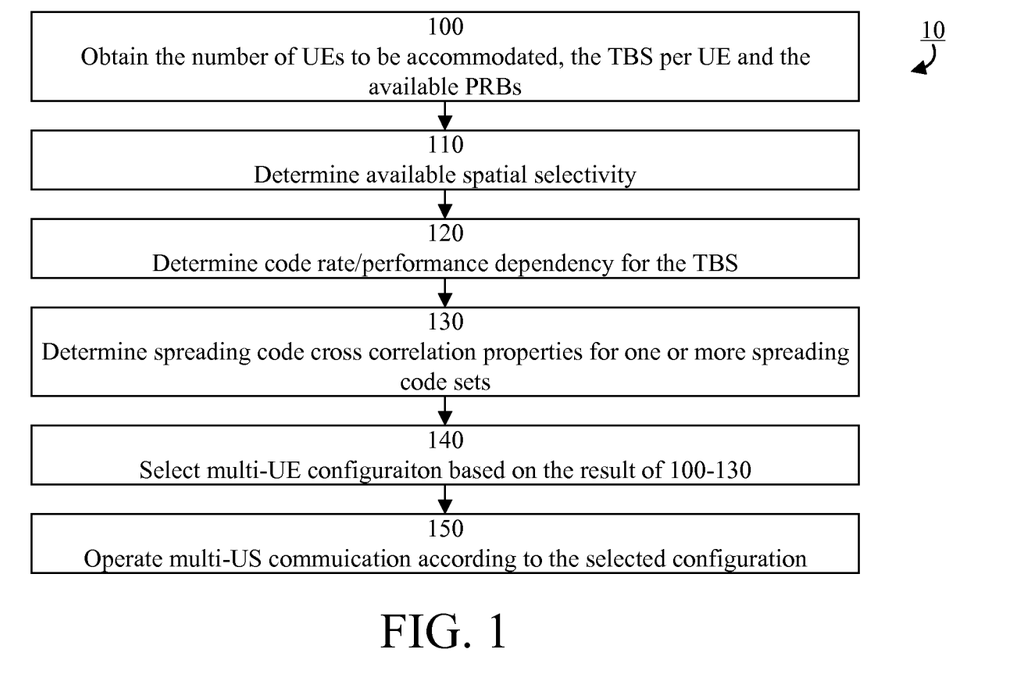
FIG. 1 is a flowchart illustrating example method steps according to some embodiments.

FIG. 1 illustrates an example method 10 according to some embodiments.

Step 100 comprises obtaining the number of UEs to be accommodated, the transmission block size (TBS) per UE, and the available PRBs. For example, the NW (e.g. a NW node, a gNB, or a control unit in the NW) obtains the number of UEs to be accommodated, the TBS per UE, and the number of available PRBs. This information is typically available from scheduler information (e.g., when compliant with technical specification, TS, 38.214 for third generation partnership program, 3GPP, new radio, NR). Typically, the method may be performed as part of a scheduler implementation, and relies on some scheduling parameters provided as input parameters.

Step 110 comprises determining available spatial selectivity. For example, the NW determines the available number of spatial degrees of freedom (DoF). In some embodiments (e.g., for some deployments), this information may be determined based on the number of currently active antenna elements (possibly together with, or replaced by, other considerations).

The NW may further estimate an expected pairwise inter-UE interference suppression Ls (e.g., in dB) which depends on whether—and by how much—the T/F resource reuse factor exceeds the number of spatial DoFs. This metric may, for example, be in terms of a total or average suppression, a worst-case leakage among the UEs, etc.

The determination of step 110 may, for example, comprise retrieving stored results from numerical simulations.

Generally, the number of available spatial DoF is typically limited to the number of antenna elements at the receiver and/or at the transmitter. Thus, the number of antenna elements is one parameter that may be used to determine available spatial selectivity.

However, the number of UEs that may be separated may, in practice, be lower than the maximum limit. UE separation typically relies on the ability to steer nulls of the transmission pattern of each UE in the directions of other UEs. Such ability may be impacted by the quality of channel estimation. For low-quality channel estimates, locations of the actual null(s) may deviate from the desired locations (the directions of other UEs) and inter-UE interference remains. Thus, the quality of channel estimation is one parameter that may be used to determine available spatial selectivity.

Furthermore, it is typically hard to separate two UEs located in a "close" vicinity of each other (where "close" may be on the order of 1/N, for example, of the full coverage line/sphere and N is the number of antenna elements per array dimension). Thus, the distance between UEs (as seen by the receiver) is one parameter that may be used to determine available spatial selectivity.

The actual expected number of spatial DoFs in different scenarios (e.g. line-of-sight, LOS, or rich fading) with different performance loss (or lack of interference suppression) may, for example, be determined numerically and stored in a receiver look-up table (LUT).

Step 120 comprises determining code rate/performance dependency for the TBS. For example, the NW evaluates the coding gain Gc (e.g., in dB) for the given TBS for different code rates or for different number of PRBs allocated to non-spread UE signal. The coding gain may be provided as a single metric for the target BLER level or may be quantified separately for different SINR operating points. The determination of step 120 may, for example, comprise retrieving stored results from numerical simulations.

Step 130 comprises determining spreading code cross-correlation properties for one or more spreading code sets. For example, the NW determines spreading code cross-correlation properties for two or more candidate spreading code sets. An example of such spreading code sets is shown in Table 1, describing example signal configurations of FIG. 3, which will be described later herein.

The cross-correlation properties may, for example, be expressed in terms of a pairwise inter-UE suppression figure Lcc (e.g., in dB) that describes the effect of cross-code leakage. The metric may, for example, describe total or average suppression, worst-case leakage among the UEs, etc. It should be noted that the spreading codes referred to here may be, but are not necessarily, the same as NOMA signatures or signature sequences.

Step 140 comprises selecting multi-UE configuration based on results of 100-130. For example, the collected information from 100-130 is used to determine the preferred multi-user coordination mode and its parameters.

Step 150 comprises operating multi-UE communication according to the selected configuration of step 140. For example, the NW signals an indication of the selected mode and related parameters (e.g., the allocation of PRB, SS, time domain resource, frequency domain resource, number of layers, etc.) to the UEs and performs MU transmission/reception.

Figure 2:
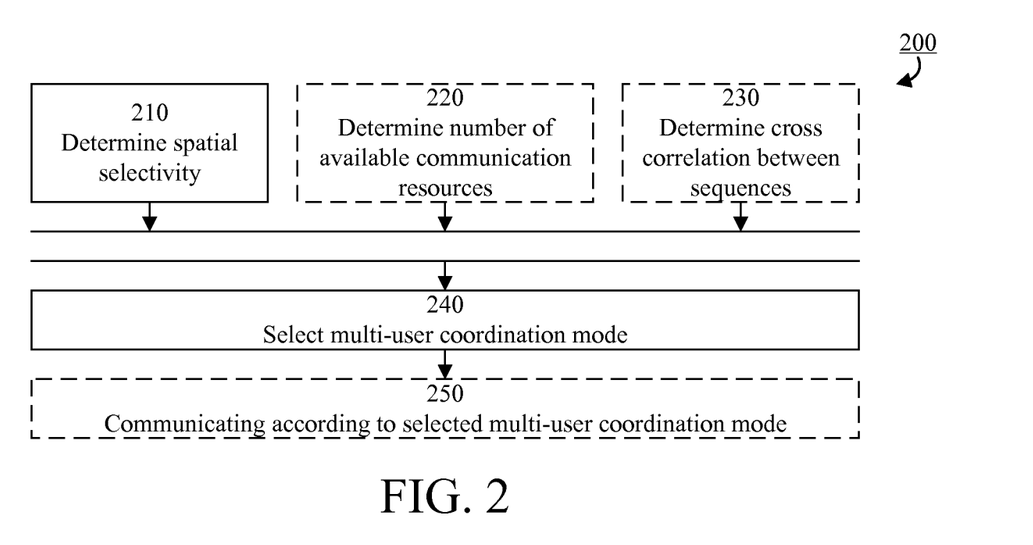
FIG. 2 is a flowchart illustrating example method steps according to some embodiments.

FIG. 2 illustrates an example method 200 of a communication device configured with two or more multi-user coordination modes for communication with a plurality of users according to some embodiments.

In step 210 (compare with step 110 of FIG. 1), an available spatial selectivity for the plurality of users is determined. In optional steps 220 (compare with step 100 of FIG. 1), a number of available communication resources (e.g., resources in time domain and/or frequency domain) for the plurality of users is determined. In optional step 230 (compare with step 130 of FIG. 1), a cross correlation between signature sequences associated with the plurality of users is determined. The determinations of steps 210, 220 and 230 may be performed in parallel as illustrated in FIG. 2. Alternatively, one or more of the steps 210, 220, 230 may be performed sequentially with any of the other steps, or at completely different points in time and/or at different time intervals.

In step 240 (compare with step 140 of FIG. 1), one of the two or more multi-user coordination modes is selected based on the determined available spatial selectivity and a number of users of the plurality, and possibly also based on one or more of determined number of available communication resources and the determined cross correlations. In optional step 250 (compare with step 150 of FIG. 1), communication is performed according to the selected multi-user coordination mode.

The two or more multi-user coordination modes comprise an orthogonal multiple access mode (e.g., COMA using T/F separation), a spatial multiple access mode (e.g., MU-MIMO), and a non-orthogonal multiple access mode (e.g., NOMA).

Various suitable combinations may also be included in the two or more multi-user coordination modes. For example, one mode may comprise a combination of orthogonal multiple access and spatial multiple access (such a combination may simply also be referred to as a spatial multiple access mode), one mode may comprise combination of orthogonal multiple access and non-orthogonal multiple access (such a combination may simply also be referred to as a non-orthogonal multiple access mode), one mode may comprise a combination of non-orthogonal multiple access and spatial multiple access, and/or one mode may comprise a combination of orthogonal multiple access, spatial multiple access, and non-orthogonal multiple access (such a combination may simply also be referred to as a non-orthogonal multiple access mode).

Selection of the multi-user coordination mode in step 240 may be performed in any suitable manner, and several examples will be given herein.

In some embodiments, the orthogonal multiple access mode is selected when the number of available communication resources (e.g., in time and/or frequency domain) is higher than, or equal to, the number of users of the plurality.

In some embodiments, the spatial multiple access mode (typically orthogonal multiple access combined with spatial multiple access) is selected when the number of available communication resources (e.g., in time and/or frequency domain) is less than the number of users of the plurality, and the number of available communication resources, for each spatially separable group of users, is higher than, or equal to, the number of users of the group.

In some embodiments, the non-orthogonal multiple access mode (typically orthogonal multiple access combined with non-orthogonal multiple access, and possibly also combined with spatial multiple access) is selected when the number of available communication resources (e.g., in time and/or frequency domain) for at least one of the spatially separable groups of users is less than the number of users of the group.

In some embodiments, there may be a selection between one of the non-orthogonal multiple access mode (typically orthogonal multiple access combined with non-orthogonal multiple access, and possibly also combined with spatial multiple access) and the spatial multiple access mode (typically orthogonal multiple access combined with spatial multiple access) when the number of available communication resources for at least one of the spatially separable groups of users is less than the number of users of the group.

In such embodiments, the selection may be based on an achievable performance metric for each of the non-orthogonal multiple access mode and the spatial multiple access mode. This provides a way to trade-off benefits and disadvantages of the two different modes. For example, the achievable performance metric may be an overall data rate for the plurality of users, and/or a per-user data rate (e.g., in terms of average or worst case).

To describe the general principles of some examples presented herein, it is assumed that the number of UEs to be served and the total available T/F resources are fixed or predetermined. Some extreme examples of modes for operating multiple UEs in a system include:
(1) allocating each UE to a dedicated set of PRBs in COMA mode;
(2) operating all UEs in overlapping resources in MU-MIMO mode;
(3) using NOMA spreading over full T/F resources, using a SS set whose size equals the number of UEs.

Approach (1) may not always be feasible; due to the insufficient total number of PRBs when the number of UEs is large, and/or due to requiring more than one PRB per UE to accommodate the TBS or to provide sufficient error protection.

Approach (2) may not always be feasible when the number of UEs exceeds the spatial selectivity of the channel. Spatial selectivity (spatial separation) may refer to the ability to steer independent nulls in the directions of other UEs while receiving a signal of a particular UE.

Approach (3) may result in inferior performance compared to (1) and (2); e.g., if the resulting SS set is large in relation to the spreading factor and therefore incurs high inter-UE correlation.

Some embodiments offer a consistent resource allocation framework, by recognizing and combining the insights that decreasing the coding rate for a UE has a diminishing return in terms of increased robustness for given channel conditions and, generally, up to N UEs may be spatially separated by a receiver employing N antenna elements (but the number of separable UEs may be smaller in some conditions).

The framework according to some embodiments finds a favorable trade-off and a middle ground between (1)-(3) based on, at least, the principles that the degrading effect of residual interference between co-scheduling UEs should typically be smaller than the increased robustness due to lowered data rates (via adjusted MCS, TBS scaling, etc.) and that NOMA spreading should typically be introduced only when the de-spreading-based improvement in UE separation exceeds the loss from increased coding rate.

In the NOMA context, the term (over)loading typically refers to the number of UEs that share same T/F resources; the reuse factor. In a maximally (over)loaded system, this number is typically equal to the spreading factor of the SS. However, the same number of UEs may be accommodated in several different ways; with different reuse factors. Thus, parameters of main interest are therefore the number of UEs to be accommodated and the available resources (e.g. the number of PRBs).

Figure 3:
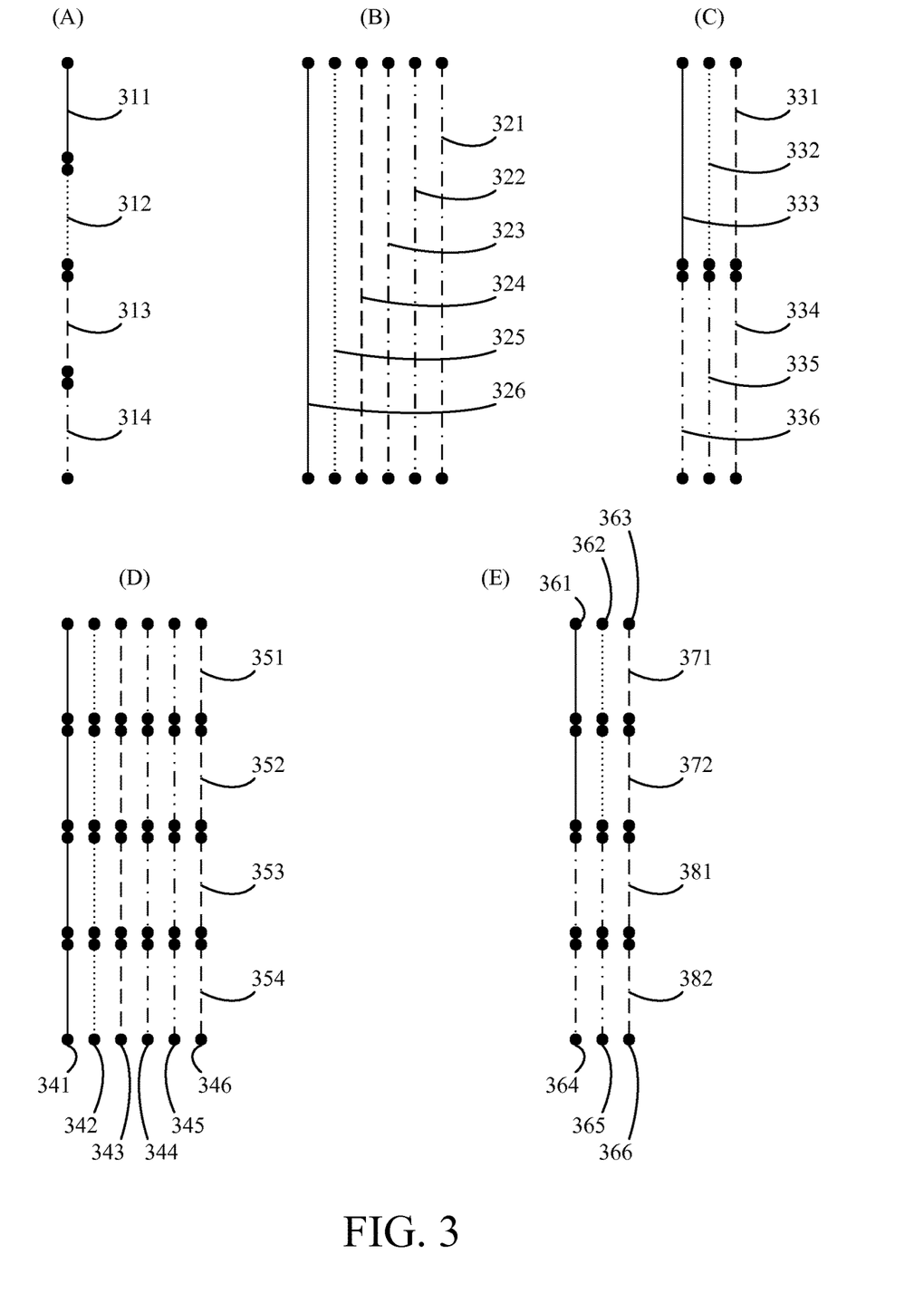
FIG. 3 is a schematic drawing illustrating various multi-user coordination modes according to some embodiments.

FIG. 3 schematically illustrates various multi-user coordination modes according to some embodiments. Some examples are depicted of signal allocations according to different MU transmission modes which also illustrates various trade-offs as mentioned above. It is assumed in these examples that 4 PRBs are available (e.g., in a frequency domain; represented in a vertical direction of FIG. 3).

Configuration (A) exemplifies COMA transmission (extreme example (1) above). This approach can accommodate up to 4 UEs (the signals of which represented as 311, 312, 313, 314, respectively), each allocated in own separate PRBs.

If more UEs (e.g. 6 UEs) need to be handled simultaneously, MU-MIMO transmission may be invoked, sharing resources between all UEs (the signals of which represented as 321, 322, 323, 324, 325, 326 respectively) as exemplified by configuration (B) (extreme example (2) above).

An alternative MU-MIMO approach is exemplified by configuration (C) where the available bandwidth of the frequency domain is divided into two orthogonal sections, and where the resources of each section is shared by 3 UEs (the signals of which are represented, respectively, as 331, 332, 333 for one section and as 334, 335, 336 for the other section).

If the maximum number of spatial degrees of freedom exceeds the number of UEs (6 in this example, e.g. when 8-16 antennas are employed), configuration (B) may likely be the preferred coordination mode, since a relatively low code rate may be used for that mode.

If the maximum number of spatial degrees of freedom does not exceed the number of UEs (e.g. when 4-6 antennas are employed in this example), configuration (C) may be preferable since excessive cross-talk within each group of UEs (one group per section) is avoided; which offsets the reduced coding gain from a higher-rate MCS.

Configurations (D) and (E) exemplifies NOMA transmission using SS-based symbol-level spreading where PRBs (351, 352, 353, 354; 371, 372; 381, 382) of each UE (341, 342, 343, 344, 345, 346; 361, 362, 363, 364, 365, 366) are essentially repeated across (part of) the signal bandwidth with different weights. Configuration (D) illustrates a case with 6 UEs and an SS length equal to 4, where each UE (341, 342, 343, 344, 345, 346) is associated with PRBs over the entire bandwidth (351, 352, 353, 354) via respective length 4 SS. Configuration (E) illustrates a case with 6 UEs and an SS length equal to 2, where each UE (361, 362, 363, 364, 365, 366) is associated with PRBs over respective halves of the entire bandwidth (371, 372 and 381, 382) via respective length 2 SS.

With similar explanation as above, configuration (D) may be preferred when a relatively high number of spatial degrees of freedom are available. However, contrarily to above, the number of spatial degrees of freedom typically need to be equal to, or exceed, the number of UEs since the spreading also contribute to separation of the signals. If no or very few spatial degrees of freedom are available, configuration (E) may in be preferred.

The examples of FIG. 3 illustrate frequency domain spreading (over PRB), while it should be noted that time domain spreading (over resource elements RE) may be used alternatively, or in combination.

COMA and/or MU-MIMO may be seen as special cases of NOMA spreading according to some embodiments. Adopting an alternative view of COMA and/or MU-MIMO transmission as NOMA-style transmission with a certain spreading code illustrates how resource allocation optimization may be applied to both MU-MIMO and NOMA resource allocation. To illustrate this, the example configurations of FIG. 3 may be characterized as defined in Table 1. The spreading length for configuration (E) is stated as 4 (differing from the NOMA SS length definition before) to obtain a consistent description of spreading code sets over all configurations for the 4-PRB bandwidth.

This alternative view of configurations may be used to determine the point of switching between the MU modes, not only to determine spreading length choices within each mode. For example, when the number of UEs is 6, and the number of antennas is 2, then NOMA mode with spreading factor of at least 3 is needed.

some embodiments, demodulation reference signals (DMRS) resource elements (REs) may be used to aid estimation, applying appropriate scaling, etc.

In some embodiments where K UEs are to be accommodated, a relative performance metric A is formed for each configuration by combining the coding gain Gc for the given per-UE PRB allocation, pairwise spatial suppression Ls and spreading-based pairwise suppression Lcc:

$$A[dB]=dB\ [lin(Gc[dB])(1/(1+(K-1)lin(Ls[dB]+Lcc[dB])))],$$

where the term $1/(1+(K-1)lin(Ls\ [dB]+Lcc\ [dB]))$ represents the SINR degradation due to imperfect spatial separation and non-orthogonal spreading. This performance metric may be used for the selection of step 140, for example.

In some embodiments, Ls and Lcc are averages over all UEs, including both (near-)perfect and imperfect pairwise relations. In other embodiments, the worst-case or total suppression metrics may be used and multiplication with K 1 may be omitted.

Figure 4:
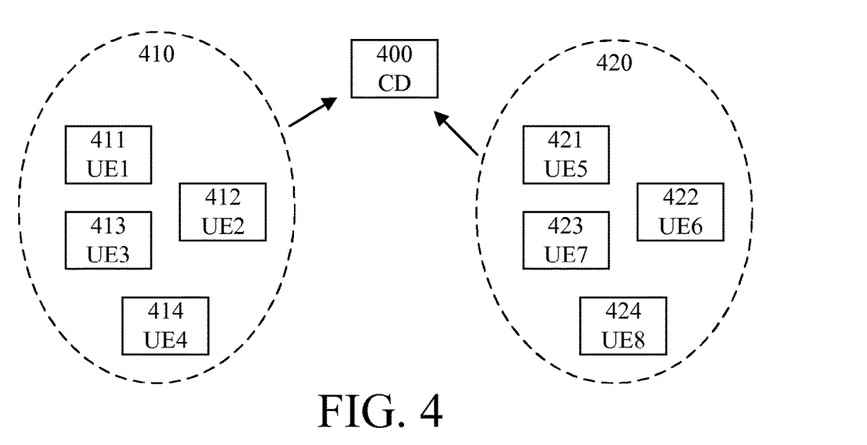
FIG. 4 is a schematic drawing illustrating grouping according to some embodiments.

FIG. 4 schematically illustrates example grouping of UEs to be separated by NOMA (e.g. via SS) according to some embodiments. The communication device (CD) 400 receives signals from eight UEs (UE1-UE8) 411, 412, 413,

TABLE 1

Example characterization of candidate configurations (multi-user coordination modes) according to FIG. 3.

| Configuration | #PRBs/UE | Spreading length | T/F reuse factor | Spreading set |
|---|---|---|---|---|
| A | 1 | 4 | 1 | U1: 1 0 0 0 |
|   |   |   |   | U2: 0 1 0 0 |
|   |   |   |   | U3: 0 0 1 0 |
|   |   |   |   | U4: 0 0 0 1 |
| B | 4 | 1 | 6 | U1-U6: 1 |
| C | 2 | 2 | 3 | U1-3: 1 0 |
|   |   |   |   | U4-6: 0 1 |
| D | 1 | 4 | 6 | Un: WSMA(4, n) |
| E | 1 | 4 | 3 | U1: WSMA(2, 1) 0 0 |
|   |   |   |   | U2: WSMA(2, 2) 0 0 |
|   |   |   |   | U3: WSMA(2, 3) 0 0 |
|   |   |   |   | U4: 0 0 WSMA(2, 1) |
|   |   |   |   | U5: 0 0 WSMA(2, 2) |
|   |   |   |   | U6: 0 0 WSMA(2, 3) |

The principles exemplified in FIG. 3 and Table 1 may be applied to steps 130 and 140 of FIG. 1 where cross-correlations are determined and multi-UE configuration is selected. Using Table 1 as an example for scheduling 6 UEs into 4 PRBs, the configurations (B)-(E) may be analyzed in step 130 and a relative performance metric may be determined for each configuration and used in the selection of step 140. In this example, configuration (A) need not be considered since 6 UEs cannot be accommodated in a COMA manner.

Typically, the mode with the best performance metric may be selected. An example approach will now be given for the selection of step 140; quantifying performance gains and trade-offs.

The trade-offs may be evaluated and compared, e.g., in terms of their resulting data channel SNR, SIR, or SINR effects. The trade-offs may be quantified via resulting relative performance metrics of the candidate configurations that are obtained by combining performance losses and/or gains due to different parameter choices. The trade-offs may be evaluated in terms of average or instantaneous metrics (e.g. SINR). The evaluation may take place separately over sub-bands or jointly over the entire signal bandwidth. In

414, 421, 422, 423, 424. The eight UEs are grouped into two groups 410, 420 wherein UEs of one group are spatially separable from all users of the other group. Within each group, the users are separated using suitable SSs as will be exemplified later herein. The receiver of the communication device 400 may process the users of each group in parallel if the UEs of different groups are (close to) orthogonal.

Proper design and allocation of signature sequences SS may particularly facilitate this approach. The grouping is then known ahead of time and if the intra-group SSs are orthogonal, interference within the group is fully removed (after de-spreading).

Certain types of welch-bound spreading multiple access (WSMA) SS design allow defining groups of sequences that are mutually orthogonal such that non-zero cross-correlation is present only between groups. One such approach is described in the following:

A (potentially large) set of SSs may be provided with non-uniform inter-sequence cross-correlation properties, wherein some sequence pairs have low cross-correlation whereas other sequence pairs have high cross-correlation. As a general principle, obtaining relatively low cross-correlation for some SS pairs leads, for an unchanged total set size, to increased cross-correlation for other pairs.

The approach may include implicitly or explicitly grouping the UEs during SS allocation so that intra-group SS cross-correlation is low. Thereby, the SSs may be used for efficient user separation within each group. In contrast, inter-group SS correlation may be allowed to be high since the SSs will not be primarily relied upon to separate inter-group users. For that, other mechanisms (e.g. spatial approaches) may be used.

This is illustrated in FIG. 4 depicting UL NOMA where UE1-UE8 are allocated SSs 1-8 respectively. The groups 410, 420 are separated at the receiver of 400 by applying spatial suppression to UEs from the other group(s) when the users of one group are to be detected. Within each group, it is primarily the SS properties that are used to separate the intra-group users.

In this example, the SSs 1-4 allocated to UE1-UE4 have low cross-correlations, as have SSs 5-8 allocated to UE5-UE5. In contrast any SS pair where the SSs belong to different groups (e.g., SS1 and SS5) is allowed to have relatively high cross-correlation. Denoting the nth SS by a column vector $S_n$ and forming an SS matrix $S=[S_1 \ldots S_8]$, S may have a structure that yields:

$$S^H S = \begin{bmatrix} 1 & L & L & L & H & H & H & H \\ L & 1 & L & L & H & H & H & H \\ L & L & 1 & L & H & H & H & H \\ L & L & L & 1 & H & H & H & H \\ H & H & H & H & 1 & L & L & L \\ H & H & H & H & L & 1 & L & L \\ H & H & H & H & L & L & 1 & L \\ H & H & H & H & L & L & L & 1 \end{bmatrix},$$

where, H and L denote relatively "high" and relatively "low" cross-correlation values, respectively. The entries marked with L may represent zero or non-zero magnitudes, and they may or may not differ between different positions. The entries marked with H may represent relatively high magnitudes (at least on average) compared to the L-marked entries, and they may or may not differ between different positions. Possibly, the entries marked H may also represent relatively small magnitudes compared to potential cross-correlation magnitudes in general, so that the SSs may provide also some extent of inter-group separation.

Typically, users that are not otherwise separable (time-frequency-spatial) may be allocated SSs that have a corresponding intra-group $S^H S$ block of the form:

$$\begin{matrix} 1 & L & L & L \\ L & 1 & L & L \\ L & L & 1 & L \\ L & L & L & 1 \end{matrix}$$

In some embodiments, the base set for SS generation is, e.g., a Grassmannian set where the $S^H S$ has the structure shown above.

An example of SS computation by the NW will now be given to illustrate one approach how SS vectors may be produced to generate codebooks and/or individual UE SS vectors. The obtained SSs may then be signaled or otherwise distributed to UEs.

Assume there are K single antenna transmitters communicating with a single antenna receiver. Each transmitter has a single symbol to transmit. This symbol modulates a temporal codeword (CW) vector, called a signature sequence (SS), before transmitting the vector over N symbols or time slots, i.e., the symbol is spread (or repeated) over N time slots. It should be noted that this representation is a sampled baseband version of the communication process.

Since all the transmitters access the channel over the same N time (and/or frequency) slots, there is interference among them. This interference arising due to multiple access (MA) is called multiple access interference (MAI). The MA communication may be viewed as a network with N degrees of freedom (DoF) trying to serve K users, each with a required quality of service (QoS).

The design of the SSs may aim at placing each CW at an optimal distance (or angle) from other CWs in the vector space.

When K≤N, there can always be a collision free transmission from all the users, since there can be at least one DoF, which is a time (and/or frequency) slot, for each user for its transmission. This leads to an interference free transmission and such a MA transmission scheme is called orthogonal multiple access (OMA). With OMA there is a performance loss, which is quite visible when each user has a QoS. The system capacity (SC) is also not optimal.

OMA is not possible when the system is overloaded, i.e., when K>N. So the SS vectors should be carefully adjusted to allow controlled interference among the users such that the performance indicators are optimized. Since the SS vectors are no longer orthogonal, the MA scheme is known as Non-Orthogonal Multiple Access (NOMA). The SS for each of the K users should preferably be designed in such a manner that the overall mean squared error (MSE) is minimized. Choosing another performance indicator (PI) such as the signal-to-noise-plus-interference ratio (SINR) or the SC is also a possibility while considering the SS design.

It may be desirable to maximize these two PIs in the NW. Fortunately for an overloaded system, under certain design conditions, optimizing one PI leads to optimizing the other two PIs. To understand this, another PI—called total squared correlation (TSC), which is directly related to the previously mentioned three PIs—may be introduced. The SS is designed by optimizing (or minimizing) the TSC since the NW optimality, in the SC sense and also simultaneously in the overall MSE sense, is defined by the achievable lower bounds (LB) on the TSC in an overloaded system.

For the transmitter k, let $b_k$ be the transmitted symbol that modulates a unit norm SS vector $s_k$. The signal model may be given as y=Sb+z, where z is the zero-mean additive white Gaussian noise vector with a covariance matrix I, the overall SS matrix with a CW in each of its columns is S, the transmit symbol vector is b. The transmit power of each transmitter is set to unity, so the power control problem is not addressed here. A unit norm temporal receive filter $f_k$, such as a matched filter (MF) or a linear minimum mean squared error (MMSE) filter, may be employed by the receiver to obtain an estimate $\hat{b}_k$ for the transmitted symbol $b_k$. The post processed SINR of each user is given as:

$$\gamma_k = \frac{|f_k^H s_k|^2}{\sum_{j=1, j\neq k}^{K} |f_k^H s_j|^2 + |f_k^H z|^2} = \frac{1}{f_k^H \left(\sum_{j=1,j\neq k}^{K} s_j s_j^H + I\right) f_k} \xrightarrow{f_k = s_k} \frac{1}{\text{trace}((SS^T)^2) - 1 + v_k},$$

where trace(•) is the trace operator, $v_k$ is the noise component in the SINR $\gamma_k$. The trace(•) term in the denominator is the TSC, which also contains the desired unit signal power. So an additional unity term arises in the denominator. If the post processed noise is white, i.e., the noise power of each $v_k$ is the same, then the TSC can directly be used as a PI.

A LB known as Welch Bound (WB) is defined for the TSC. For overloaded systems it is given as $$\frac{K^2}{N} \leq$$

and for the under loaded systems it is K≤TSC. To meet the optimality conditions in the mentioned PIs, the bound should be satisfied by equality. In such a case, the obtained SS is called a Welch Bound Equality (WBE) SS. It should be noted that the SC optimality may not be achieved by the binary WBE SS vectors.

For the construction of the WBE SS, interference avoidance (IA) techniques are known. A nice property of IA methods is that the SS can be obtained iteratively in a sequential and distributed manner. It is guaranteed that the iterations converge, since there exists a fixed-point for S that is an optimum. Though verifying if the obtained optimum is local or global is not easy. By optimum it is meant that the entire matrix S converges as an ensemble (as against each CW convergence), with the considered PI reaching the required tolerance. Hence the converged WBE CWs are not unique. At convergence, all the mentioned PIs are optimized.

From the center part of the SINR equation, let $$R_k = \left(\sum_{j=1, j \neq k}^{K} s_j s_j^H + I\right),$$

which is the correlation matrix of the interference plus noise. It can be readily identified that minimizing the denominator (or equivalently maximizing $\gamma_k$) is a well known Rayleigh-Quotient problem. From this, the Eigen vector corresponding to the minimum Eigen value of $R_k$ may be considered as CW for user k, if it is assumed that $f_k$ is matched to $s_k$. The fixed-point iterations start from the users choosing a random CW. In a given sequential user order, each user updates its SS $s_k$ by solving the Eigen value problem while other SS, $s_j$, j≠k, are kept fixed. After user k, the next user updates it's CW in the same way by assuming the other CWs to be fixed. The iterations progress up to the final user in the order, such that in each iteration there are K updates, one for each CW in S. After the final update in the given iteration, the first user in the order restarts the updates until convergence.

Again, from the center part of the SINR equation, the solution to $f_k$ can also be identified as the well known Generalized Eigen Value Problem (GEVP), i.e., finding a common Eigen value for the matrix pair (I, $R_k$). The solution to which is the linear MMSE vector given as $$\frac{R_k^{-1} s_k}{\left(s_k^H R_k^{-2} s_k\right)^{1/2}},$$

in its normalized form. Sequential iterations as mentioned before can be used, except that instead of solving the Eigen value problem, the normalized linear MMSE expression is used during updates. For this SINR maximization problem (or TSC minimization), the obtained solution to S from both the MMSE IA iterations and the Eigen vector IA iterations is the same fixed-point.

A Kronecker product based approach may be employed to obtain (or construct) higher dimensional WBE SS, i.e., higher N values, from lower dimensional WBE SS. If the elements of S are binary antipodal, then WBE set is defined when N is a multiple of 4, i.e., mod(N, 4)=0. In cases with mod(N, 4)≠0, where the WB is loose, a LB known as Karystinos-Pados (KP) bound may be used instead.

Figure 5:
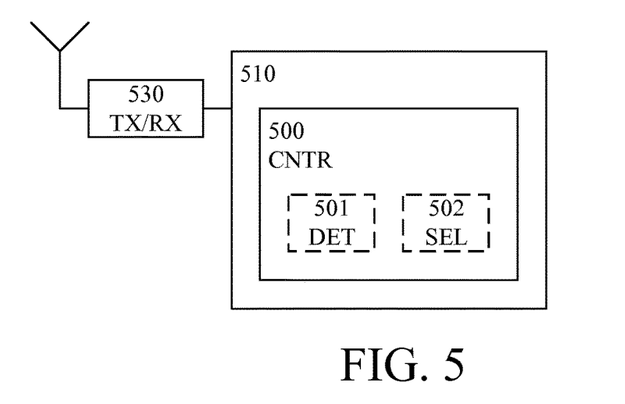
FIG. 5 is a schematic block diagram illustrating an example apparatus according to some embodiments.

FIG. 5 schematically illustrates an example apparatus 510 for a communication device configured with two or more multi-user coordination modes according to some embodiments. Any of the features and examples described above (e.g., in connection with FIGS. 1 and/or 2) may be equally applicable to the example apparatus 510. For example, the example apparatus 510 may be configured to cause execution of the method steps of any of the methods 10 and 200 of FIGS. 1 and 2.

The example apparatus 510 comprises controlling circuitry (CNTR) 500 configured to cause determination of an available spatial selectivity for the plurality of users. To this end, the controlling circuitry may comprise or be otherwise associated with determining circuitry (DET; e.g., a determiner) 501 configured to determine the available spatial selectivity for the plurality of users (and possibly also to determine other parameters as explained in connection to FIGS. 1 and 2). The determining circuitry may be comprised in or otherwise associated with (e.g., connectable, or connected, to) the example apparatus 510.

The controlling circuitry (CNTR) 500 is also configured to cause selection of one of the two or more multi-user coordination modes based on the determined available spatial selectivity and a number of users of the plurality. To this end, the controlling circuitry may comprise or be otherwise associated with selecting circuitry (SEL; e.g., a selector) 502 configured to select one of the two or more multi-user coordination modes based on the determined available spatial selectivity and a number of users of the plurality. The selecting circuitry may be comprised in or otherwise associated with (e.g., connectable, or connected, to) the example apparatus 510.

The controlling circuitry (CNTR) 500 is also configured to cause communication with the plurality of users according to the selected multi-user coordination mode. To this end, the example apparatus may comprise or be otherwise associated with (e.g., may be connectable, or connected, to) transmitting and/or receiving circuitry (e.g., a transmitter and/or a receiver; illustrated in FIG. 5 as a transceiver, TX/RX, 530) configured to communicate with the plurality of users according to the selected multi-user coordination mode.

The example apparatus 510 of FIG. 5 may, for example, be comprised in a communication device (e.g., any of a wireless communication device, a (wireless) receiver device, and a radio access node (e.g., a network node)).

Thus, according to various embodiments, a method is disclosed for transmitting signals from multiple UEs in a spatially selective environment, e.g., using a multi-antenna receiver in the UL. Depending on the desired/required overloading factor (the number of UEs sharing the same T/F resource), UEs are allocated according to MU-MIMO and/or NOMA to utilize the available spatial degrees of freedom to maximize a target metric (e.g., the sum data rate over served users). T/F overlap may be allowed, as far as possible, between UEs that can be separated spatially, resulting in substantially interference-free operation. NOMA degrees of freedom may be introduced (only) when spatial degrees no longer suffice. Selection of the operating mode may be based on a comparison of figures of merit for different candidate configurations. Typically, no qualitative decisions may be required.

The approaches have primarily been described for UL MU transmission, but the principles can also be applied to DL transmission. Then, the receiver considerations (e.g. IRC) may be replaced by precoding considerations (e.g. MMSE).

A UE transmitter may use the common representation for multiple MA modes (e.g., as illustrated by Table 1) simplify transmitter processing and to reduce the number of transmit schemes to be implemented, regardless of whether the UE is configured in COMA, MU-MIMO, or NOMA modes. It may be noted that the COMA and MU-MIMO configurations may be transparent to the UE, since a UE generally does not need to know whether other UEs are simultaneously transmitting in same T/F resources.

In some embodiments, the NW may employ a common transmission configuration notation for configuring UEs that may operate in COMA, MU-MIMO, NOMA, etc. modes. The spreading notation of Table 1 is one example of such configuration, where the column parameters in the table (one or more of the number of PRBs per UE, spreading length, and the spreading sequence for a given UE) are provided to the UE. Other parameter set examples may be devised that can convey equivalent information. The configuration of the UE may be done using, e.g., downlink control information (DCI; UL grant) and/or radio resource control (RRC) signaling.

Some approaches have been illustrated using the assumption that the TBS for the different UEs are equal. Cases with different TBS sizes may be handled according to the same principles, e.g., by specifying the coding gain parameters separately, per-UE.

Furthermore, not only the coding rate, but also the modulation types, number of layers and signature specific parameters can be adjusted adaptively based on the metrics discussed herein. Even though symbol level spreading have been used for illustration herein, other NOMA schemes, e.g., bit level scrambling methods and sparse symbol level mapping methods, are not precluded.

The resource scheduling is not limited to the rule that MU-MIMO is firstly considered while NOMA is only secondly considered when COMA is not enough to accommodate a number of users. For example, a hybrid allocation of OMA/MU-MIMO/NOMA can be used, which depends on channel conditions (when available in the NW) and/or estimated interference from the NOMA allocation. In some such embodiments, NOMA may be used firstly for overloading when there is a sufficient number of good SS, and MU-MIMO may be used secondly when the available NOMA resources are not sufficient. An advantage of such an approach is that having less UEs to be served by MU-MIMO for a given number of receive antennas results in better block error rate (BLER) performance.

Further, the principles presented herein may be used to adjust the number of layers for MIMO and the number of layers used in NOMA (e.g. for enhanced mobile broadband, eMBB, operation). Such approaches may include one or more of the following combinations: MIMO and "NOMA with different users", MIMO and "NOMA with different layers", MU-MIMO and "NOMA with different users", and MU-MIMO and "NOMA with different layers". A multiple of layers can also be adopted in one NOMA group.

Single-user MIMO (SU-MIMO) can also be mixed with the NOMA transmissions, for different UEs and/or for different layers. In this case, the "layer" concept may be used for both SU-MIMO and NOMA.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a (wireless) receiver device, a (wireless) communication device, or a radio access node (e.g., a network node).

Embodiments may appear within an electronic apparatus (such as a (wireless) receiver device, a (wireless) communication device, or a radio access node) comprising arrangements, circuitry, and/or logic according to any of the embodiments described herein. Alternatively or additionally, an electronic apparatus (such as a (wireless) receiver device, a (wireless) communication device, or a radio access node) may be configured to perform methods according to any of the embodiments described herein.

Figure 6:
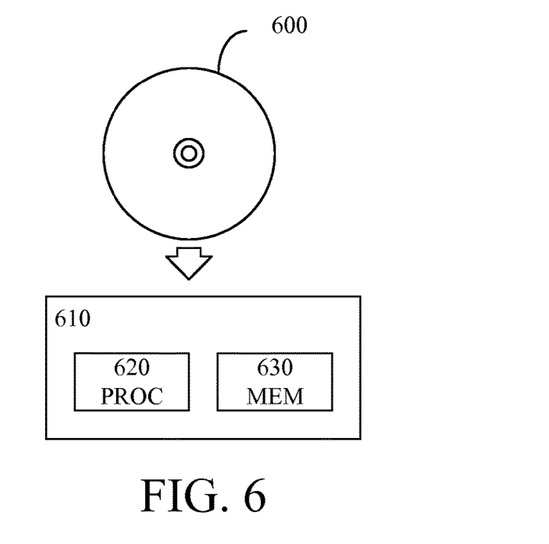
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a (wireless) receiver device, a (wireless) communication device, or a radio access node 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the solution.

For example, the method embodiments described herein discloses example methods through steps being performed in a certain order. However, it is recognized that these sequences of events may take place in another order without departing from the scope of the solution. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step follows or precedes another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the solution are intended to be embraced therein.

The invention claimed is:

1. A method of a communication device configured with two or more multi-user coordination modes for communication with a plurality of users, the method comprising:
   determining an available spatial selectivity for the plurality of users; and
   selecting one of the two or more multi-user coordination modes based on the determined available spatial selectivity and a number of users of the plurality of users, wherein
   selecting one of the two or more multi-user coordination modes comprises selecting a spatial multiple access mode when:
   a number of available communication resources for the plurality of users is less than the number of users of the plurality of users, and
   a number of available communication resources for each spatially separable group of users is higher than or equal to a number of users in the group.

2. The method of claim 1, wherein the two or more multi-user coordination modes comprise an orthogonal multiple access mode the spatial multiple access mode, and a non-orthogonal multiple access mode.

3. The method of claim 2, wherein selecting one of the two or more multi-user coordination modes comprises selecting the orthogonal multiple access mode when the number of available communication resources is higher than, or equal to, the number of users of the plurality of users.

4. The method of claim 1, further comprising determining the number of available communication resources for the plurality of users, and wherein selecting the multi-user coordination mode is further based on the determined number of available communication resources.

5. The method of claim 1, wherein selecting one of the two or more multi-user coordination modes comprises selecting the non-orthogonal multiple access mode when the number of available communication resources for at least one of the spatially separable groups of users is less than the number of users of the group.

6. The method of claim 1, wherein selecting one of the two or more multi-user coordination modes comprises, when the number of available communication resources for at least one of the spatially separable groups of users is less than the number of users of the group, selecting one of the non-orthogonal multiple access mode and the spatial multiple access mode.

7. The method of claim 6, wherein selecting one of the non-orthogonal multiple access mode and the spatial multiple access mode is based on an achievable performance metric for each of the non-orthogonal multiple access mode and the spatial multiple access mode.

8. The method of claim 7, wherein the achievable performance metric is an overall data rate for the plurality of users.

9. The method of claim 1, further comprising determining a cross correlation between signature sequences associated with the plurality of users, and wherein selecting the multi-user coordination mode is further based on the determined cross correlations.

10. The method of claim 1, further comprising communicating with the plurality of users according to the selected multi-user coordination mode.

11. A computer program product comprising a non-transitory computer readable medium, having thereon a computer program comprising program instructions, the computer program being loadable into a data processing unit and configured to cause execution of the method according to claim 1 when the computer program is run by the data processing unit.

12. An apparatus for a communication device configured with two or more multi-user coordination modes, the apparatus comprising controlling circuitry configured to cause:
   determination of an available spatial selectivity for the plurality of users; and
   selection of one of the two or more multi-user coordination modes based on the determined available spatial selectivity and a number of users of the plurality of users, wherein
   the controlling circuitry is further configured to cause the selection of one of the two or more multi-user coordination modes by causing selection of a spatial multiple access mode when:
   a number of available communication resources is less than a number of users of the plurality of users; and
   a number of available communication resources for each spatially separable group of users is higher than or equal to a number of users in the group.

13. The apparatus of claim 12, wherein the two or more multi-user coordination modes comprise an orthogonal multiple access mode, the spatial multiple access mode, and a non-orthogonal multiple access mode.

14. The apparatus of claim 13, wherein the controlling circuitry is further configured to cause the selection of one of the two or more multi-user coordination modes by causing selection of the orthogonal multiple access mode when the number of available communication resources is higher than, or equal to, the number of users of the plurality of users.

15. The apparatus of claim 12, wherein the controlling circuitry is further configured to cause determination of the number of available communication resources for the plurality of users, and wherein the selection of the multi-user coordination mode is further based on the determined number of available communication resources.

16. The apparatus of claim 12, wherein the controlling circuitry is further configured to cause the selection of one of the two or more multi-user coordination modes by causing selection of the non-orthogonal multiple access mode when the number of available communication resources for at least one of the spatially separable groups of users is less than the number of users of the group.

17. The apparatus of claim 12, wherein the controlling circuitry is further configured to cause the selection of one of the two or more multi-user coordination modes by, when the number of available communication resources for at least one of the spatially separable groups of users is less than the number of users of the group, selection of one of the non-orthogonal multiple access mode and the spatial multiple access mode.

18. The apparatus of claim 17, wherein the controlling circuitry is further configured to cause the selection of one of the non-orthogonal multiple access mode and the spatial multiple access mode is based on an achievable performance metric for each of the non-orthogonal multiple access mode and the spatial multiple access mode.

19. The apparatus of claim 18, wherein the achievable performance metric is an overall data rate for the plurality of users.

20. The apparatus of claim 12, wherein the controlling circuitry is further configured to cause determination of a cross correlation between signature sequences associated with the plurality of users, and wherein the controlling circuitry is further configured to cause the selection of the multi-user coordination mode further based on the determined cross correlations.

21. The apparatus of claim 12, wherein the controlling circuitry is further configured to cause communication with the plurality of users according to the selected multi-user coordination mode.

22. A communication device comprising the apparatus of claim 12.

* * * * *

UNITED STATES PATENT AND TRADEMARK OFFICE
CERTIFICATE OF CORRECTION

| | | |
|---|---|---|
| PATENT NO. | : 11,870,514 B2 | Page 1 of 1 |
| APPLICATION NO. | : 17/276310 | |
| DATED | : January 9, 2024 | |
| INVENTOR(S) | : Andres Reial et al. | |

It is certified that error appears in the above-identified patent and that said Letters Patent is hereby corrected as shown below:

On the Title Page

Left Column, Item (30), under "FOREIGN APPLICATION Priority Data", delete "Sep. 27, 2019 (WO) ... PCT/CN2019/076164" and insert -- Sep. 28, 2018 (WO) ... PCT/CN2018/108194 --, therefor.

Signed and Sealed this
Thirteenth Day of February, 2024

Katherine Kelly Vidal
*Director of the United States Patent and Trademark Office*